(12) United States Patent
Barthelt

(10) Patent No.: US 6,480,348 B1
(45) Date of Patent: Nov. 12, 2002

(54) ARRANGEMENT FOR THE CONTACTLESS TRANSMISSION OF OPTICAL DATA

(75) Inventor: Klaus Barthelt, Grafschaft (DE)

(73) Assignee: Stemmann-Technik GmbH, Schüttorf (DE)

( * ) Notice: Subject to any disclaimer, the term of this patent is extended or adjusted under 35 U.S.C. 154(b) by 0 days.

(21) Appl. No.: 09/647,773

(22) PCT Filed: Feb. 2, 2000

(86) PCT No.: PCT/DE00/00273
§ 371 (c)(1),
(2), (4) Date: Dec. 18, 2000

(87) PCT Pub. No.: WO00/46943
PCT Pub. Date: Aug. 10, 2000

(30) Foreign Application Priority Data

Feb. 4, 1999 (DE) .......................................... 199 04 461

(51) Int. Cl.⁷ ............................................... G02B 5/04
(52) U.S. Cl. ........................... 359/834; 359/831; 385/25
(58) Field of Search ............................ 385/26, 25, 31, 385/33, 36; 359/831, 833, 834

(56) References Cited

U.S. PATENT DOCUMENTS 4,109,997 A * 8/1978 Iverson ........................ 385/26
5,991,478 A * 11/1999 Lewis et al. .................. 385/26

FOREIGN PATENT DOCUMENTS

| DE | 2846526 | 5/1980 | | |
|---|---|---|---|---|
| DE | 3205065 | 8/1983 | | |
| DE | 3400361 | 7/1985 | | |
| GB | 2 127 568 A | * | 4/1984 | ........... G03B/27/54 |

* cited by examiner

Primary Examiner—Cassandra Spyrou
Assistant Examiner—Euncha Cherry
(74) Attorney, Agent, or Firm—Friedrich Kueffner

(57) ABSTRACT

The invention relates to an arrangement (1) for the contactless transmission of data between a rotating component and a stationary component by means of light signals which are transmitted by a projector (2) and detected by a receiver (4). According to the invention, a ring-shaped light-conducting body (5) which consists of a transparent material and has integrated reflecting prisms is integrated between the projector (2) and the receiver (4). The exit surface (10) of the light-conducting body (5) opposite the receiver (4) is matt. The projector (2) is allocated to the stationary component and the receiver (4) is allocated to the rotating component This enables light signals to be permanently transmitted from the stationary component to the rotating component, with a high data rate at a high relative speed.

5 Claims, 3 Drawing Sheets

ARRANGEMENT FOR THE CONTACTLESS TRANSMISSION OF OPTICAL DATA

BACKGROUND OF THE INVENTION

1. Field of the Invention

For the transmission of data between a stationary and a rotating component it is known to convert digital electrical signals into light signals, to transmit these light signals subsequently by a projector (sender) onto a receiver where the received light signals are then reconverted into digital electrical signals. The projector or the receiver in this connection can be correlated with the stationary or the rotating component, respectively.

2. Description of the Related Art

The known contactless data transmission proves to be still satisfactory when only a minimal data rate is to be transmitted and, moreover, the relative speed between the stationary and the rotating component is not very high. Problems result, however, when greater data rates are to be transmitted at a higher relative speed. The reason for this is the fact that a transmission of data is possible only when the projector and the receiver are on the same optical axis. However, this is the case only once for each revolution. Moreover, difficulties with respect to the continuity of the data transmission result in this connection.

SUMMARY OF THE INVENTION

The solution to this object according to the invention resides in that between the projector and the receiver an annular light guide body of a transparent material with integrated reflection prisms is integrated and the exit surface of the light guide body opposite the receiver has a matte finish.

The invention uses in this connection the known effect that light which impinges on the surface of a glass body or a glass-like body can be propagated in this body by total reflection. When then also reflection prisms are provided on the body such that the critical angle of total reflection is surpassed, each of the light beams guided through the body exits refractedly at the interface glass/air, referred to as free surface. If, moreover, the exit surface has a matt finish, the light will exit in a diffuse way so that the free surface irradiates.

The invention now employs an annular light guide body of a transparent material such as glass or plastic. With the directed arrangement of reflection prisms on the light guide body, each light beam introduced into the light guide body is totally reflected up to the matt finish exit surface (free surface) where the light beam then exits diffusely. The receiver opposite this free surface can thus receive the light directly and guide it farther in a directed way to the electronic evaluation device. Independent of whether the light guide body rotates relative to the receiver or the receiver rotates relative to the light guide body, the receiver at any time can receive the light signal emitted by the projector and can guide it farther.

The invention thus makes it possible to guide the light signals emitted by the projector continuously via the light guide body to a receiver, independent of the position of the receiver and light guide body relative to one another. In this way, in comparison to the prior art, a considerably increased data rate can be transmitted in a contactless way with significantly higher relative speed between the stationary and the rotating component.

In the context of the invention the light signals are transmitted only in one direction, i.e., either from the stationary to the rotating component or from the rotating to the stationary component. If a bidirectional signal transmission is desired, two arrangements that are independent from one another are required.

A further advantage of the invention resides in that, due to the annular configuration of the light guide body, its free central area can be used for receiving components such as, for example, axles and shafts. Moreover, it is feasible that cables or lines for the transport of any type of product can be arranged within this central area.

The light guide body according to the invention is easily manufactured, for example, by injection molding of acrylic glass. In this way, light guide bodies can be produced economically and especially precisely reproducibly in almost any desired size and in high numbers.

An especial advantageous embodiment of the invention is seen in the features of claim 2. In accordance therewith, the projector comprises at least one laser diode which is pulsable according to the rhythm of digital electrical signals and the receiver comprises at least one photo transistor coupled directly or indirectly with an electronic evaluation device. Accordingly, it is possible to integrate almost any number of laser diodes, with different wavelengths and with receivers appropriately adjusted thereto, into the arrangement. Thus, it is possible to contactlessly transmit simultaneously light signals that are independent from one another between a stationary and a rotating component via the light guide body.

In this context, according to claim 3 it is then advantageous that each of the photo transistors has a filter, adjusted to a certain wavelength, especially in a bandwidth range of approximately 2 nanometer (nm), correlated therewith.

Since in the context of the invention a light beam introduced into the light guide body is divided by the annular configuration of the light guide body and passes through it in two directions, the two light beams, aside from the ideal 180° position of the projector and the receiver, always travel two different distances. The receiver must therefore evaluate two light signals which are staggered temporally relative to one another. In the case of great data rates and high relative speeds, this can result in that the precision of the data transmission is less than desirable. In order to ensure also in these situations a qualitatively absolutely satisfactory data transmission, the invention suggests according to the features of claim 4 that the projector has a collimator as well as a light guide array comprising several light guides of identical length, wherein the light guides are connected with identical spacing circumferentially to the light guide body in a light-conducting way. The number of light guides depends in this connection substantially on the data rate, the relative speed of the stationary to the rotating component, the desired transmission quality as well as the size of the light guide body being used. Light guides of identical length as well as the uniformly staggered circumferential arrangement of the connections of the light guides to the light guide body ensure that each light beam must travel only short distances in the light guide body. The result is a very minimal propagation delay of the respective light signal in combination with a considerably greater receiving precision. The data rate can be extremely high while providing a great relative speed of the rotating to the stationary component.

A further perfection of the inventive arrangement is provided by the features of claim 5. Accordingly, the light guides correlated with a laser diode by means of the light guide array are connected to shells which are connected with the annular light guide body to form a unitary part. Moreover, reflection prisms are provided on the light guide body which are correlated with the individual shells and are accordingly configured in a segmented and shell-like fashion. This configuration ensures that the light signal introduced via a light guide into each shell will enter only the segment of the light guide body correlated with this shell. A circular propagation of the light in the light guide body is reliably prevented.

Due to the segmented configuration of the reflection prisms it could be possible that gaps result between neighboring segments which would cause disruptions. These gaps are prevented according to claim 5 in that the reflection prisms, which, in comparison to the light guide body, have deviating curvatures, penetrate one another at the interfaces of the shells and the light guide body. This results in overlap of the light spots at the interfaces so that no temporal displacements and also no propagation delays of the light signals will result because of the simultaneous phase-identical introduction of the light into the shells.

BRIEF DESCRIPTION OF THE DRAWINGS

The invention will be explained in the following with the aid of embodiments illustrated in the drawings. It is shown in.

DESCRIPTION OF PREFERRED EMBODIMENTS

Figure 1:
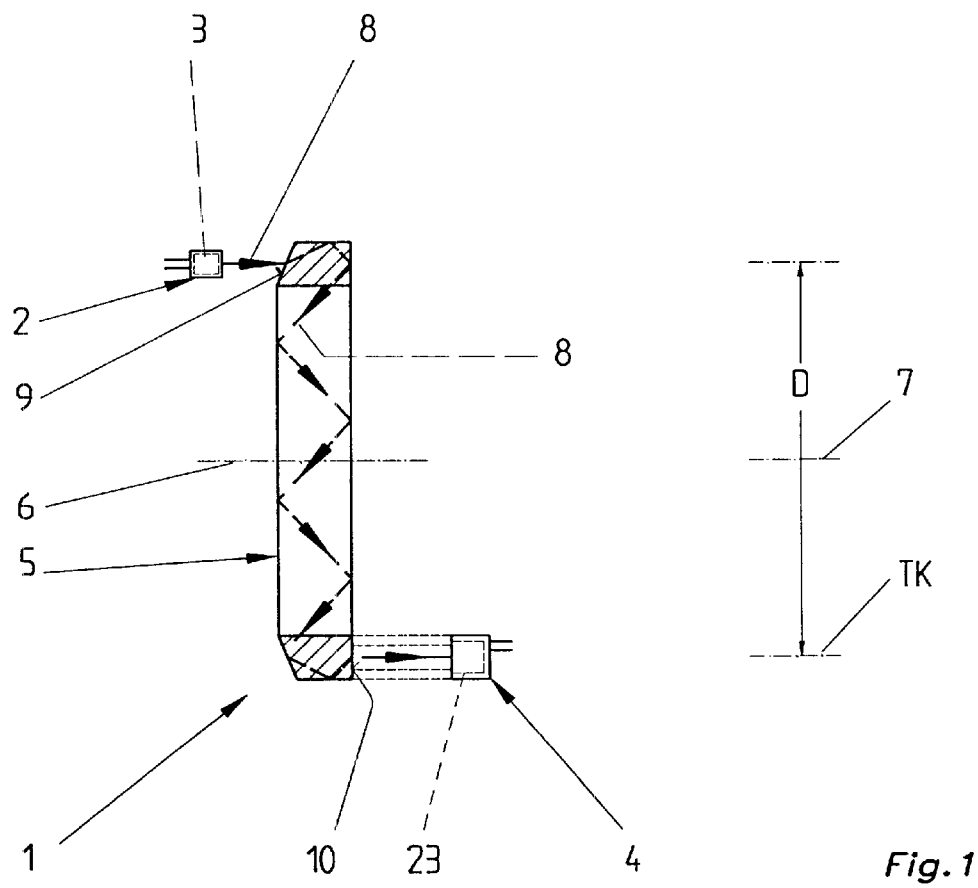
FIG. 1 a schematic section representation of an arrangement for contactless transmission of data by means of light signals.

In FIG. 1 an arrangement for contactless transmission of data between a rotating and a stationary component is referenced by numeral 1. The two components are not represented in detail. A projector 2 is correlated with the stationary component and comprises a laser diode 3 pulsable according to the rhythm of digital electrical signals. A receiver 4 in the form of a photo transistor 23, coupled to an electronic evaluation device, not shown in detail, is correlated with the rotational component. The receiver 4 rotates on a reference circle TK with the diameter D.

An annular light guide body 5 of injection-molded acrylic glass is arranged stationarily between the projector 2 and the receiver 4. The central axis 6 of the light guide body 5 extends coaxially to the rotational axis 7 of the receiver 4.

When a light beam 8 is sent by the projector 2 via the end face 9 into the light guide body 5, this light beam 8 is propagated in the light guide body 5 by total reflection. By means of reflection prisms, not illustrated in detail in FIG. 1, the light beam 8 is finally deflected such within the light guide body 5 that the critical angle of total reflection is surpassed. The light beam 8 then exits diffusely at the matt finish annular free surface 10 of the light guide body 5. This free surface 10 irradiates so that the receiver 4, in any relative position to the light guide body 5, can receive this light and guide it to the electronic evaluation device.

When the light is now switched on and off at the projector 2 in the rhythm of digital electrical signals, these electrical signals are transformed into light signals. The receiver 4 can receive these light signals at any location of the free surface 10 and, by means of suitable electronic measures, they are then reconverted again into digital electrical signals. The continuity of the transmission is ensured.

Figure 2:
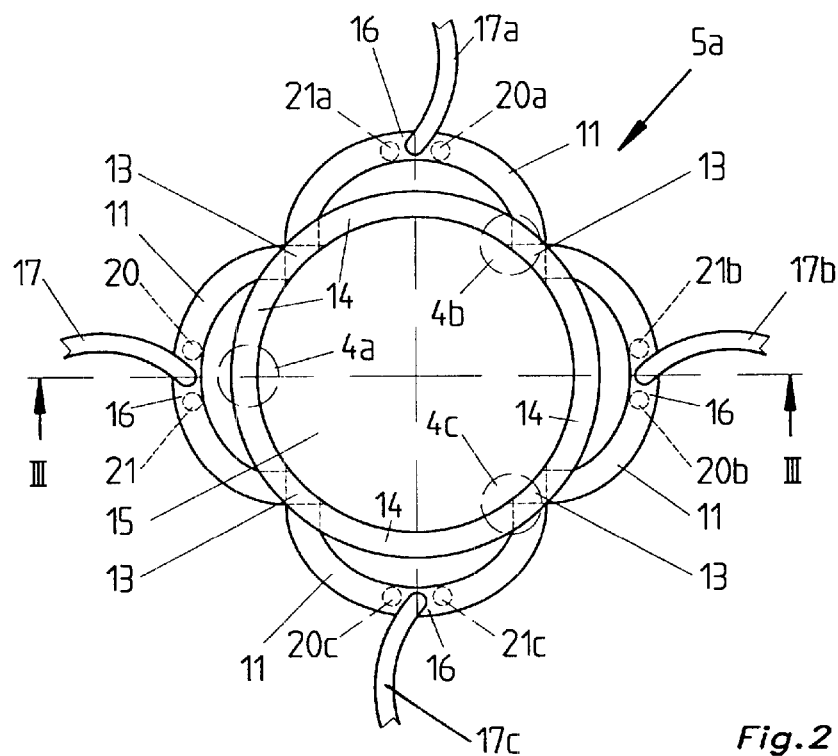
FIG. 2 a schematic end view of a light guide body according to a further embodiment.
Figure 3:
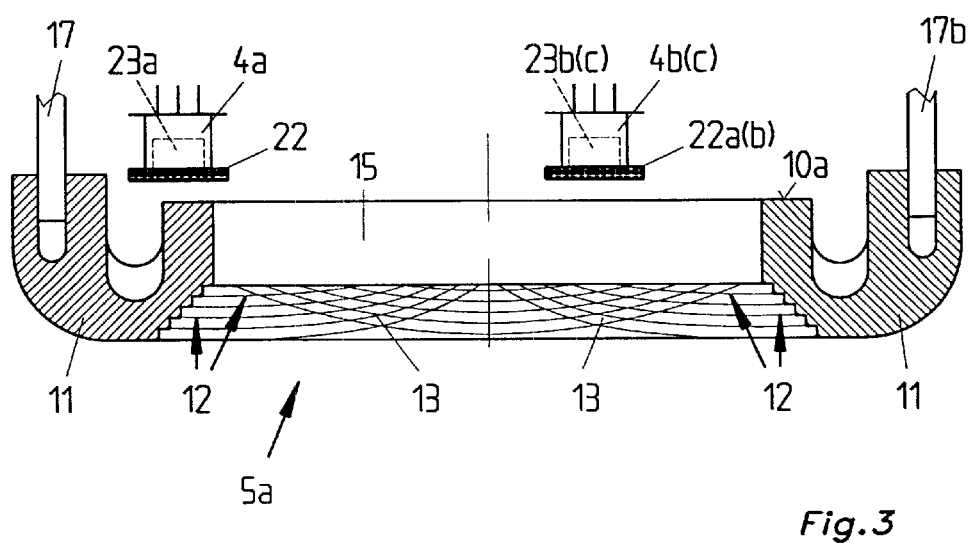
FIG. 3 an enlarged representation of a cross-section of FIG. 2 along the line III—III.

In FIGS. 2 and 3 an embodiment of a light guide body 5a is illustrated in which shells 11 are formed as a unitary part on the circumference of the light guide body 5a. These shelves 11 have an approximately L-shaped cross-section. In the embodiment four such shells 11 are provided on the circumference of the light guide body 5a and are staggered by 90° relative to one another, respectively.

In the area of each shell 11 the inner side of the light guide body 5a is provided with segmented reflection prisms 12 of a shell-like configuration (FIG. 3). The segmented configuration results from the curvature of the reflection prisms 12 being smaller than the curvature of the light guide body 5a. At the interfaces 13 of the shells 11 with the light guide body 5a the reflection prisms 12 of neighboring segments 14 penetrate one another.

The annularly shaped free surface 10a of the light guide body 5a is of a matt finish.

The central area 15 of the light guide body 5a is open and is therefore suitable for guiding axles, shafts, cables or lines therethrough.

Figure 4:
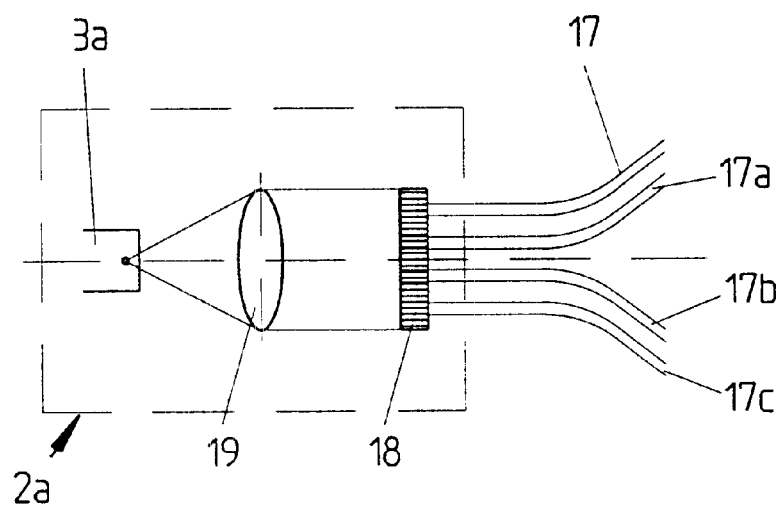
FIG. 4 a schematic representation of a projector with light guides.

Light guides 17, 17a–c are connected to the central areas 16 of the shells 11. They have identical length and are combined with their other ends to a light guide array 18 according to FIG. 4. This light guide array 18 is illuminated by means of a suitable collimator 19 by a pulsed laser diode 3a. The light guide array 18, collimator 19, and laser diode 3a are combined to a projector 2a.

Figure 5:
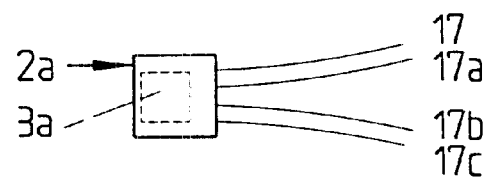
FIG. 5 a schematic representation of three projectors of different wavelengths with light guides.
Figure 5:
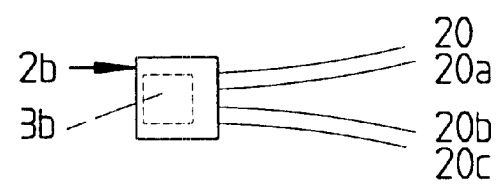
Figure 5:
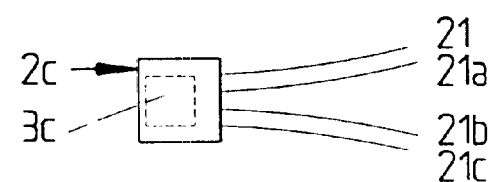

When according to FIG. 5 several such projectors 2a, 2b, 2c, in the embodiment 3 projectors 2a, 2b, 2c, are provided with laser diodes 3a, 3b, 3c which emit light of different wavelengths and when their light guides 17, 17a–c; 20, 20a–c; 21, 21a–c are each also connected to a respective shell 11 (dash-dotted representation in FIG. 2), several independent light signals can be transmitted in parallel.

In the embodiment according to FIGS. 2, 3 and 5, each laser diode 3a, 3b, 3c then requires its own receiver 4a, 4b, 4c with a photo transistor 23a, 23b, 23c. Filters 22, 22a, 22b are correlated with these receivers 4a, 4b, 4c and are adjusted to the different wavelengths. The receivers 4a, 4b, 4c are positioned directly opposite the free surface 10a.

List of reference numerals

1—arrangement
2—projector
  2a—projector
  2b—projector
  2c—projector
3—laser diode
  3a—laser diode
  3b—laser diode
  3c—laser diode
4—receiver
  4a—receiver
  4b—receiver
  4c—receiver
5—light guide body
  5a—light guide body
6—center axis of 5
7—rotational axis of 4

8—light beam
9—end face of 5
10—free surface of 5
   10a—free surface of 5a
11—shells
12—reflection prisms
13—interfaces of 11 and 5a
14—segments of 5a
15—central area of 5a
16—central area of 11
17—light guide
   17a—light guide
   17b—light guide
   17c—light guide
18—light guide array
19—collimator
20—light guide
   20a—light guide
   20b—light guide
   20c—light guide
21—light guide
   21a—light guide
   21b—light guide
   21c—light guide
22—filter
   22a—filter
   22b—filter
23—photo transistor
   23a—photo transistor
   23b—photo transistor
   23c—photo transistor
D—diameter of TK
TK—reference circle

What is claimed is:

1. An arrangement for contactless transmission of data between a rotating component and a stationary component by means of light signals emitted by a projector (2, 2a–c) and detected by a receiver (4, 4a–c), wherein between the projector (2, 2a–c) and the receiver (4, 4a–c) an annular light guide body (5, 5a) of a transparent material with integrated reflection prisms (12) is integrated and wherein the exit surface (10, 10a) of the light guide body (5, 5a) opposite the receiver (4, 4a–c) has a matte finish, wherein shells (11) are formed as a unitary part on the circumference of the light guide body (5a), which shells are matched to the number of the light guides (17, 17a–c; 20, 20a–c; 21, 21a–c) and are connected to the light guides (17, 17a–c; 20, 20a–c; 21, 21a–c) in a light-guiding fashion, and wherein several of the integrated reflection prisms (12) segmented to match the shells (11) are provided on the light guide body (5a).

2. The arrangement according to claim 1, wherein the projector (2, 2a–c) comprises at least one laser diode (3, 3a–c) pulsable in the rhythm of digital electrical signals and wherein the receiver (4, 4a–c) comprises at least one photo transistor (23, 23a–c) coupled with an electronic evaluation device.

3. The arrangement according to claim 2, wherein each photo transistor (23, 23a–c) has correlated therewith a filter (22, 22a, 22b) adjusted to a certain wave length.

4. The arrangement according to claim 2 or 3, wherein the projector (2a–c) comprises a collimator (19) as well as a light guide array (18) provided with several light guides (17, 17a–c; 20, 20a–c; 21, 21a–c) of identical length, wherein the light guides (17, 17a–c; 20, 20a–c; 21, 21a–c) are circumferentially connected with equal spacing to the light guide body (5a) in a light-guiding fashion.

5. The arrangement according to claim 1, wherein the integrated reflection prisms (12), having a deviating curvature in comparison to the light guide body (5a), are penetrating one another at the interfaces (13) of the shells (11) with the light guide body (5a).

\* \* \* \* \*